United States Patent
Odejerte, Jr. et al.

(10) Patent No.: US 10,262,479 B2
(45) Date of Patent: Apr. 16, 2019

(54) SYSTEM AND METHOD FOR COMMUNICATING WITH A VEHICLE

(71) Applicant: Huf North America Automotive Parts Manufacturing Corp., Milwaukee, WI (US)

(72) Inventors: Antonio Odejerte, Jr., Farmington Hills, MI (US); William Vosotros, Farmington Hills, MI (US); Ji Won Lee, Farmington Hills, MI (US)

(73) Assignee: HUF NORTH AMERICA AUTOMOTIVE PARTS MFG. CORP., Milwaukee, WI (US)

( * ) Notice: Subject to any disclaimer, the term of this patent is extended or adjusted under 35 U.S.C. 154(b) by 0 days.

(21) Appl. No.: 15/897,629

(22) Filed: Feb. 15, 2018

(65) Prior Publication Data

US 2018/0247472 A1 Aug. 30, 2018

Related U.S. Application Data

(60) Provisional application No. 62/462,958, filed on Feb. 24, 2017.

(51) Int. Cl.
*G07C 9/00* (2006.01)
*B60R 16/023* (2006.01)
(Continued)

(52) U.S. Cl.
CPC ........ *G07C 9/00007* (2013.01); *B60R 16/023* (2013.01); *G01S 5/0284* (2013.01);
(Continued)

(58) Field of Classification Search
CPC ...... G07C 9/00007; G07C 2009/00769; H04B 17/318; H04W 4/48; H04W 4/80; H04W 4/40
(Continued)

(56) References Cited

U.S. PATENT DOCUMENTS

2003/0193388 A1 10/2003 Ghabra et al.
2004/0081248 A1* 4/2004 Parolari ............... H04L 1/0003
375/259
(Continued)

FOREIGN PATENT DOCUMENTS

DE 102014102328 A1 8/2014
EP 1184236 A2 3/2002
(Continued)

OTHER PUBLICATIONS

European Patent Office, Extended European Search Report for EP Application No. 18157909.5, dated Apr. 18, 2018.

*Primary Examiner* — Allen T Cao
(74) *Attorney, Agent, or Firm* — Honigman LLP; Matthew H. Szalach; Jonathan P. O'Brien

(57) ABSTRACT

A method includes determining a distance between a vehicle access device and a vehicle. The method also includes activating at least one communication node in response to the distance being less than a threshold distance, and transmitting a signal from the at least one communication node. The method further includes gathering a plurality of received signal strength indication values corresponding to the signal, filtering the plurality of received signal strength indication values, and identifying at least one communication node corresponding to a highest value of the plurality of received signal strength indication values. The method also includes determining whether the vehicle access device is disposed in an interior portion of the vehicle or on an exterior of the vehicle based on the highest value of the plurality of received signal strength indication values.

20 Claims, 5 Drawing Sheets

Figure 1:
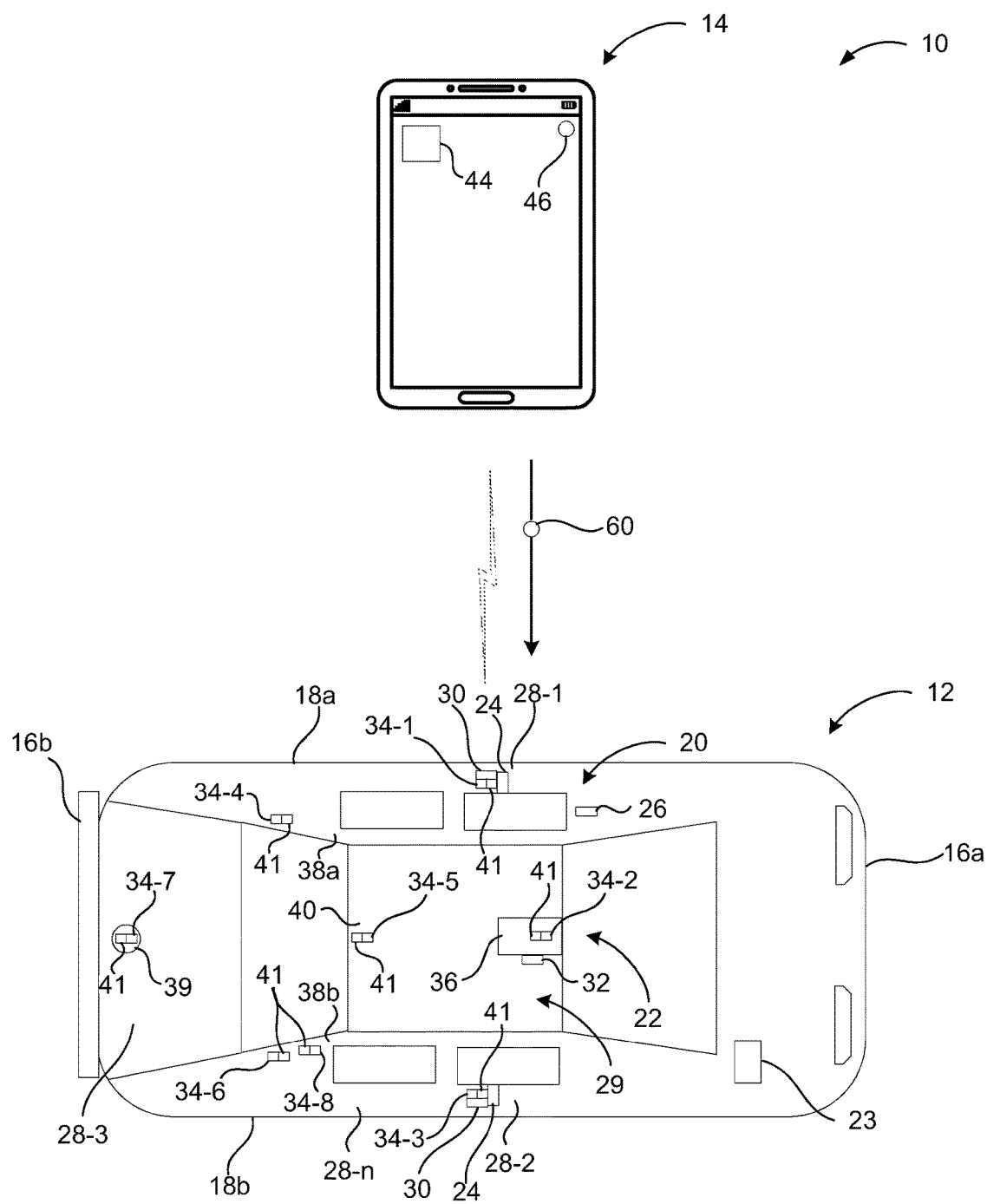

(51) Int. Cl.
*G01S 5/02* (2010.01)
*H04W 4/02* (2018.01)
*H04W 4/48* (2018.01)
*H04W 4/80* (2018.01)
*H04W 4/40* (2018.01)
*H04B 17/318* (2015.01)
*G01S 11/06* (2006.01)
*G01S 13/74* (2006.01)
*B60R 25/24* (2013.01)

(52) U.S. Cl.
CPC ............... *G01S 11/06* (2013.01); *G01S 13/74* (2013.01); *H04B 17/318* (2015.01); *H04W 4/023* (2013.01); *H04W 4/40* (2018.02); *H04W 4/48* (2018.02); *H04W 4/80* (2018.02); *B60R 25/245* (2013.01); *B60R 2325/101* (2013.01); *G07C 2009/00769* (2013.01); *G07C 2209/63* (2013.01); *H04M 2250/02* (2013.01)

(58) Field of Classification Search
USPC .......................................... 340/5.6–6.65, 963
See application file for complete search history.

(56) References Cited

U.S. PATENT DOCUMENTS

2005/0195109 A1* 9/2005 Davi ..................... G01S 5/0226
342/463
2016/0031417 A1 2/2016 Kornek et al.
2016/0320469 A1 11/2016 Laifenfeld et al.
2017/0136992 A1 5/2017 Hamada et al.

FOREIGN PATENT DOCUMENTS

| | | |
|---|---|---|
| EP | 1816039 A1 | 8/2007 |
| EP | 2278573 A1 | 1/2011 |
| EP | 2942760 A1 | 11/2015 |
| WO | WO-2015199010 A1 | 12/2015 |

* cited by examiner

SYSTEM AND METHOD FOR COMMUNICATING WITH A VEHICLE

CROSS REFERENCE TO RELATED APPLICATION

This application claims priority under 35 U.S.C. § 119(e) to U.S. Provisional Application 62/462,958, filed on Feb. 24, 2017, the disclosure of which is hereby incorporated by reference in its entirety

FIELD

The present disclosure relates generally to a system and method for communicating with a vehicle, and more particularly to a system and method for determining a location of a vehicle access device relative to a vehicle.

BACKGROUND

This section provides background information related to the present disclosure and is not necessarily prior art.

A wireless communication device, such as a key fob, a smartphone, a smart watch, or a computer (e.g., a tablet, laptop, personal digital assistant, etc.), for example, can be used to communicate with a motor vehicle. For example, a wireless communication device can communicate with a vehicle in order to access, diagnose faults, start/stop, and/or provide power to certain components and/or systems within the vehicle. In particular, a user may utilize a wireless communication protocol (e.g., short-range radio wave communication, Wi-Fi, BLUETOOTH®, near field communication (NFC), etc.) to access and/or operate the vehicle. In this regard, the operator may access and/or operate the vehicle by utilizing a wireless communication protocol controlled and powered by a smartphone.

While known systems and methods for communicating between a wireless communication device and a vehicle have proven acceptable for their intended purposes, such systems may be susceptible to undesirable operating characteristics.

SUMMARY

This section provides a general summary of the disclosure, and is not a comprehensive disclosure of its full scope or all of its features.

According to one aspect, a system for communicating with a vehicle is provided. The system may include a vehicle access device and the vehicle. The vehicle access device may include a first wireless communication node. The vehicle may include a primary wireless communication node and a plurality of secondary wireless communication nodes. The primary wireless communication node may be configured to communicate with the plurality of secondary wireless communication node. The first wireless communication node may be configured to communicate with the primary and secondary wireless communication nodes. The plurality of secondary wireless communication nodes may include a first secondary wireless communication node disposed on an exterior of the vehicle, a second secondary wireless communication node disposed in an interior of the vehicle, and a third secondary wireless communication node disposed on the exterior of the vehicle.

In some implementations, the first, primary, and secondary wireless communication nodes include Bluetooth Low Energy communication nodes.

In some implementations, the first secondary wireless communication node is disposed on a driver's side of the vehicle, and the third secondary wireless communication node is disposed on a passenger's side of the vehicle opposite the driver's side.

In some implementations, the system includes a fourth secondary wireless communication node disposed on the exterior of the vehicle, a fifth secondary wireless communication node disposed in the interior of the vehicle, a sixth secondary wireless communication node disposed on the exterior of the vehicle, and a seventh secondary wireless communication node disposed on the exterior of the vehicle.

In some implementations, the third secondary wireless communication node is disposed proximate a center of the vehicle, the fourth secondary wireless communication node is disposed proximate a first C-pillar of the vehicle, the fifth secondary wireless communication node is disposed in the interior of the vehicle, the sixth secondary wireless communication node is disposed proximate a second C-pillar of the vehicle, and the seventh secondary wireless communication node is disposed proximate a rear portion of the vehicle.

In some implementations, the first wireless communication node is configured to (i) receive a plurality of received signal strength indication values transmitted from the plurality of secondary wireless communication nodes, (ii) identify at least one communication node corresponding to a highest value of the plurality of received signal strength indication values, and (iii) determine whether the vehicle access device is disposed in an interior portion of the vehicle or on an exterior of the vehicle based on the highest value of the plurality of received signal strength indication values.

In some implementations, based on an identity of the at least one communication node corresponding to the highest value of the plurality of received signal strength indication values, the primary wireless communication node is configured to (i) activate one of the first communication node or the second communication node and (ii) idle the other of the first communication node or the second communication node.

In some implementations, the first wireless communication node is configured to transmit the plurality of received signal strength indication values to the primary wireless communication node.

In some implementations, the primary wireless communication node is configured to (i) identify a first value of the plurality of received signal strength indication values that occurs most frequently, (ii) identify a second value of the plurality of received signal strength indication values that occurs less frequently, and (iii) remove the second value from the gathered plurality of received signal strength indication values.

In some implementations, the vehicle includes a door and a lock control module. The lock control module may be configured to communicate with the primary wireless communication node to control access to the vehicle through the door based on the identity of the at least one communication node corresponding to the highest value of the plurality of received signal strength indication values.

According to another aspect, a method is provided. The method may includes determining a distance between a vehicle access device and a vehicle. The method also may include activating at least one communication node in response to the distance being less than a threshold distance, and transmitting a signal from the at least one communication node. The method may further include gathering a plurality of received signal strength indication values corresponding to the signal, filtering the plurality of received signal strength indication values, and identifying at least one communication node corresponding to a highest value of the plurality of received signal strength indication values. The method may also include determining whether the vehicle access device is disposed in an interior portion of the vehicle or on an exterior of the vehicle based on the highest value of the plurality of received signal strength indication values.

In some implementations, at least one communication node includes a Bluetooth Low Energy communication node.

In some implementations, filtering the plurality of received signal strength indication values includes transmitting the plurality of received signal strength indication values from the vehicle access device to the vehicle.

In some implementations, filtering the plurality of received signal strength indication values includes identifying a first value of the gathered plurality of received signal strength indication values that occurs most frequently, identifying a second value of the gathered plurality of received signal strength indication values that occurs less frequently, and removing the second value from the gathered plurality of received signal strength indication values.

In some implementations, the at least one communication node includes a plurality of communication nodes disposed on an exterior of the vehicle and a plurality of communication nodes disposed in an interior of the vehicle.

In some implementations, the method includes idling at least one of the at least one communication node.

In some implementations, the at least one of the at least one communication node is disposed in an interior of the vehicle.

In some implementations, transmitting the signal from the at least one communication node includes transmitting the signal using a high duty cycle transmission interval.

In some implementations, the at least one communication node includes a first communication node disposed in an interior of the vehicle and a second communication node disposed on an exterior of the vehicle. The method may further include activating one of the first communication node or the second communication node, and idling the other of the first communication node or the second communication node. In some implementations, the method includes transmitting the signal from the activated communication node.

According to another aspect a system and method for enhancing the performance of the Bluetooth Low Energy (BLE) wireless communication protocol is provided. The system and method may include determining the location of a vehicle access device (e.g., a key FOB, a phone, etc.), including determining whether the vehicle access device is inside or outside the vehicle. The system may include of a number of BLE communication nodes in the vehicle and a vehicle access device using BLE technology.

The vehicle access device may include a dedicated application (APPS) that is solely intended for a car access application.

The system may also include a sub-system in the vehicle comprising a main wireless communication node (M-node) which communicates with a control module (e.g., engine control module) of the vehicle via a wired communication protocol (e.g., CAN, HSCAN/CAFD, LIN, K-LINE, etc.) and a plurality of auxiliary wireless communication nodes placed at predetermined, strategic locations in the vehicle.

The M-node and the auxiliary nodes may communicate with each other via private wired communication link or wireless communication protocol (e.g., BLE, Mesh, etc.).

A BLE role assignment for the vehicle access device and the M-node may be switchable according to requirements. For example, the role could be a central role or any other role (e.g., Peripheral role, Scanner role, etc.). The auxiliary nodes may be assigned a peripheral, slave, and/or GATT server role. The location and number of wireless communication nodes may vary depending on the size of the vehicle.

In some implementations a vehicle access device that includes a mobile app (APPS) for a vehicle access feature and also includes BLE related communication secret keys (i.e. LTK) may be disposed within a predetermined distance of the vehicle, and may be advertising as a peripheral device, while the M-node is assigned to be the BLE central/scanner.

The vehicle access device may advertise BLE packets after the mobile app is activated and interacted by an end user. Once the M-node in the vehicle detects the vehicle access device, M-node may initiate a connection and the M-node and the vehicle access device may enter a connected state. During the connected state, the M-node may perform a localization algorithm process to determine the approximate location of the vehicle access device relative to the vehicle.

If the vehicle access device is within a pre-defined distance for the vehicle (e.g., less than ten meters), the M-node may send a specific command to the auxiliary nodes to wake up the auxiliary nodes. The auxiliary nodes may wake up and send a response message to the M-node to confirm that the auxiliary nodes are awake.

In some implementations, the M-node, while still connected to the vehicle access device (as a peripheral device) will ask for the vehicle access device to begin scanning. At this point, the vehicle access device may have a multi-role feature (e.g., Peripheral and Scanner). The vehicle access device may have knowledge of the auxiliary nodes on the vehicle.

After the vehicle access device confirms that it is ready to scan, the M-node may instruct each and every auxiliary node to advertise using the high duty cycle advertising interval (3.75 ms) for a 1.28 second duration, respectively.

The vehicle access device may gather received signal strength indication (RSSI) values from the auxiliary advertising nodes. The RSSI values may be filtered by the vehicle access device, or the gathered RSSI values may be transmitted to the M-node and the M-node may filter the RSSI values.

This process of auxiliary node advertising at high duty cycle and the vehicle access device's scanning operation while it is connected to the M-node may be repeated. On this initial process, the auxiliary nodes on the outside of the vehicle may advertise while the nodes inside the vehicle may be in a standby state.

Once the M-node receives the RSSI values for the external wireless communication nodes, the M-node may determine which node has the strongest (e.g., largest) RSSI value. For example, if two of the external wireless communication nodes have the strongest RSSI values relative to the vehicle access device, then, the system may focus on these two nodes. The M-node may instruct the other nodes to enter a standby state.

The two nodes having the strongest RSSI values may be instructed by the M-node to advertise alternately towards the vehicle access device. The vehicle access device may consequently send back to the M-node the RSSI value corresponding to each auxiliary node. For example, if the localization algorithm on the M-node determines that the vehicle access device is very close to the vehicle, then the M-node may wake up the wireless communication nodes inside the vehicle, and such node may advertise towards the vehicle access device one after the other (e.g., consecutively). Using this strategy and RSSI values coming from the auxiliary wireless communication nodes and the M-node, the system can determine if the vehicle access device is inside or outside the vehicle. This approach also is optimized in terms of power consumption and latency of detection. If there is more than one paired/bonded vehicle access device detected within the vehicle's vicinity, the same method may be used if, for example, the other vehicle access device is on the other side of the vehicle, where a different wireless communication node on the vehicle may perform the localization.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

FIG. 1 is a functional block diagram of an example vehicle communication system according to the present disclosure; and FIGS. 2A-2D are a flowchart depicting an example method of controlling a vehicle communication system according to the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

The description provided herein is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

With reference to FIG. 1, a vehicle communication system 10 is provided. The vehicle communication system 10 may include a vehicle 12 and a vehicle access device 14. The vehicle 12 may be any known variety of motorized vehicle, such as a car, truck, or van, for example, having a front end 16a, a rear end 16b opposite the front end 16a, a driver's side 18a, and a passenger's side 18b opposite the driver's side 18a.

The vehicle 12 may include an access system 20, a communication system 22, and one or more control modules 23 (e.g., a body control module, an engine control module, a transmission control module, etc.). The access system 20 may include one or more locks 24, a lock control module 26, and one or more doors 28-1, 28-2, . . . 28-n and/or other access location(s). The locks 24 may permit and/or prevent access to a cabin portion 29 of the vehicle 12 through the doors 28-1, 28-2, ... 28-n. For example, each door 28-1, 28-2, ... 28-n of the vehicle 12 may include a lock 24 and a handle 30. The lock control module 26 may communicate with the lock(s) 24 to permit and/or prevent operation of the handle 30 in order to permit and/or prevent access to the vehicle 12 through the doors 28-1, 28-2, ... 28-n. In this regard, the lock control module 26 may receive a signal from the communication system 22 to control a state (e.g., locked or unlocked) of the lock(s) 24 based on the signal(s) received from the vehicle access device 14.

The communication system 22 may include a communication application 32, a first communication node 34-1, a second communication node 34-2, a third communication node 34-3, a fourth communication node 34-4, a fifth communication node 34-5, a sixth communication node 34-6, a seventh communication node 34-7, and an eighth communication node 34-8. It will be appreciated that the communication system 22 may include more or less than eight communication nodes within the scope of the present disclosure. In this regard, the number of communication nodes may depend on the size, shape, or other configuration of the vehicle 12.

As will be explained in more detail below, each communication node 34-1, 34-2, 34-3, 34-4, 34-5, 34-6, 34-7, 34-8 may communicate with other(s) of the communication nodes 34-1, 34-2, 34-3, 34-4, 34-5, 34-6, 34-7, 34-8 and/or with the vehicle access device 14. For example, the communication nodes 34-1, 34-2, 34-3, 34-4, 34-5, 34-6, 34-7, 34-8 may communicate with one another, and with the vehicle access device 14, through one or more wired and/or wireless communication protocols, such as LIN Communication, CAN-FD communication, K-Line communication, short-range radio wave communication, Wi-Fi, BLUETOOTH®, and/or BLUETOOTH® low energy (BLE) (e.g., Mesh BLE or scatternet BLE). In some implementations, the communication nodes 34-1, 34-2, 34-3, 34-4, 34-5, 34-6, 34-7, 34-8 may be BLE nodes. In this regard, the communication nodes 34-1, 34-2, 34-3, 34-4, 34-5, 34-6, 34-7, 34-8 may be referred to herein as BLE communication nodes 34-1, 34-2, 34-3, 34-4, 34-5, 34-6, 34-7, 34-8.

As illustrated in FIG. 1, the communication nodes 34-1, 34-2, 34-3, 34-4, 34-5, 34-6, 34-7, 34-8 may be disposed at various locations on and/or in the vehicle 12. In this regard, the precise location of each of the communication nodes may depend on the size, shape, or other configuration of the vehicle 12. In some implementations, the first, third, fourth, sixth, and seventh communication nodes 34-1, 34-3, 34-4, 34-6, 34-7 are disposed on an exterior portion of the vehicle, while the second, fifth, and eighth communication nodes 34-2, 34-5, 34-8 are disposed in an interior portion (e.g., cabin portion 29) of the vehicle. For example, the first communication node 34-1 may be disposed on the driver's side 18a of the vehicle 12. In some implementations, the first communication node 34-1 may be located on or proximate to one of the doors 28-1, 28-2, ... 28-n of the vehicle 12. For example, the first communication node 34-1 may be located on the door 28-1 (e.g., driver's door) disposed on the driver's side 18a of the vehicle 12. In particular, the first communication node 34-1 may be disposed on or proximate to the handle 30 of the door 28-1 (e.g., driver's door) disposed on the driver's side 18a of the vehicle 12.

The second communication node 34-2 may be located within the cabin portion 29 of the vehicle 12. For example, the second communication node 34-2 may be located on or proximate to a console 36 disposed within the center (e.g., centrally disposed between the driver's side 18a and the passenger's side 18b) of the vehicle 12. In some implementations, the second communication node 34-2 is disposed between a driver's seat (not shown) and a passenger's seat (not shown) of the vehicle 12.

The third communication node 34-3 may be disposed on the passenger's side 18b of the vehicle 12. In some implementations, the third communication node 34-3 is located on or proximate to one of the doors 28-1, 28-2, ... 28-n of the vehicle 12. For example, the third communication node 34-3 may be located on the door 28-2 (e.g., passenger's door) disposed on the passenger's side 18b of the vehicle 12. In particular, the third communication node 34-3 may be disposed on or proximate to the handle 30 of the door 28-2 (e.g., passenger's door) disposed on the passenger's side 18b of the vehicle 12.

The fourth communication node 34-4 may be located on a structural member of the vehicle 12. In some implementations, the fourth communication node 34-4 is located on the driver's side 18a of the vehicle 12. For example, the fourth communication node 34-4 may be located on a C-pillar 38a on the driver's side 18a of the vehicle 12.

The fifth communication node 34-5 may be located within the cabin portion 29 of the vehicle 12. In some implementations, the fifth communication node 34-5 is located in or proximate to a central portion of the vehicle 12. In this regard, the fifth communication node 34-5 may be disposed between the driver's side 18a and the passenger's side 18b of the vehicle 12. In particular, the fifth communication node 34-5 may be disposed within a headliner 40 of the vehicle 12.

The sixth communication node 34-6 may be located on or proximate to a structural member of the vehicle 12. In some implementations, the sixth communication node 34-6 is located on the passenger's side 18b of the vehicle 12. For example, the sixth communication node 34-6 may be located on or proximate to a C-pillar 38b on the passenger's side 18b of the vehicle 12.

The seventh communication node 34-7 may be located proximate the rear end 16b of the vehicle 12. For example, the seventh communication node 34-7 may be located on or proximate to a rear door 28-3 (e.g., trunk, hatch, tailgate, etc.) of the vehicle 12. In some implementations, the seventh communication node 34-7 is disposed on or proximate to an emblem 39 (e.g., an emblem representing the manufacturer of the vehicle 12) of the vehicle 12.

The eighth communication node 34-8 may be located on or proximate to a structural member of the vehicle 12. In some implementations, the eighth communication node 34-8 is located on the passenger's side 18b of the vehicle 12. For example, the eighth communication node 34-8 may be located on or proximate to the C-pillar 38b on the passenger's side 18b of the vehicle 12.

Each communication node 34-1, 34-2, 34-3, 34-4, 34-5, 34-6, 34-7, 34-8 may include an antenna 41 and an identification code or address (e.g., a BLE address). In some configurations, the eighth communication node 34-8 may be assigned as a main or primary communication node having a major BLE address. Accordingly, the eighth communication node 34-8 may be referred to herein as the "primary communication node 34-8." In this regard, the primary communication node 34-8 may be responsible for long-range communication between the vehicle access device 14 and the vehicle 12. In particular, the primary communication node 34-8 may be responsible for communicating with the vehicle access device 14 when the distance between the vehicle access device 14 and the vehicle 12 is greater than two meters. In some implementations, the primary communication node 34-8 may be responsible for communicating with the vehicle access device 14 when the distance between the vehicle access device 14 and the vehicle 12 is greater than five meters.

The first, second, third, fourth, fifth, sixth, and seventh communication nodes 34-1, 34-2, 34-3, 34-4, 34-5, 34-6, 34-7 may be assigned as secondary BLE communication nodes, each having a minor BLE address. Accordingly, the first, second, third, fourth, fifth, sixth, and seventh communication nodes 34-1, 34-2, 34-3, 34-4, 34-5, 34-6, 34-7 may be referred to herein as "secondary BLE communication nodes 34-1, 34-2, 34-3, 34-4, 34-5, 34-6, 34-7." The minor BLE address of each of the secondary communication nodes 34-1, 34-2, 34-3, 34-4, 34-5, 34-6, 34-7 may be different than the minor BLE address of each of the other secondary communication nodes 34-1, 34-2, 34-3, 34-4, 34-5, 34-6, 34-7. Accordingly, the minor BLE addresses can allow the secondary communication nodes 34-1, 34-2, 34-3, 34-4, 34-5, 34-6, 34-7 to be differentiated from each other and from the primary communication node 34-8, which can help the vehicle access device 14 determine which of the communication nodes 34-1, 34-2, 34-3, 34-4, 34-5, 34-6, 34-7, 34-8 to communicate with when there is more than one vehicle 12.

The antenna 41 may include at least one of a directional antenna and an omnidirectional antenna. For example, in some implementations, the first, second, third, fourth, fifth, sixth, and seventh communication nodes 34-1, 34-2, 34-3, 34-4, 34-5, 34-6, 34-7 include a directional antenna 41, while the eighth communication node 34-8 includes an omnidirectional antenna. In this regard, the antenna 41 disposed on each of the first, second, third, fourth, fifth, sixth, and seventh communication nodes 34-1, 34-2, 34-3, 34-4, 34-5, 34-6, 34-7 may produce and receive an energy radiation pattern that is focused in one or more directions, while the antenna 41 disposed on the eighth communication node 34-8 may produce and receive an energy radiation pattern that is focused in a plurality of directions. For example, the antenna 41 disposed on each of the first, second, third, fourth, fifth, sixth, and seventh communication nodes 34-1, 34-2, 34-3, 34-4, 34-5, 34-6, 34-7 may produce and receive an energy radiation pattern that is focused toward one of the front end 16*a*, the rear end 16*b*, the driver's side 18*a*, and the passenger's side 18*b* of the vehicle 12, while the antenna 41 disposed on the eighth communication node 34-8 may produce and receive an energy radiation pattern that is focused toward more than one of the front end 16*a*, the rear end 16*b*, the driver's side 18*a*, and the passenger's side 18*b* of the vehicle 12. In this regard, the antenna 41 disposed on the eighth communication node 34-8 may produce and receive an energy radiation pattern that is the same (e.g., symmetrical) in all horizontal directions.

In some implementations, the radiation pattern of the antenna 41 of the first communication node 34-1 extends from the first communication node 34-1 towards the driver's side 18*a* and/or away from the passenger's side 18*b* of the vehicle 12. The radiation pattern of the antenna 41 of the second communication node 34-2 may extend from the second communication node 34-2 towards the rear end 16*b* of the vehicle 12 and/or away from the front end 16*a* of the vehicle 12. The radiation pattern of the antenna 41 of the third communication node 34-3 may extend from the third communication node 34-3 towards the passenger's side 18*b* and/or away from the driver's side 18*a* of the vehicle 12. The radiation pattern of the antenna 41 of the fourth communication node 34-4 may extend from the fourth communication node 34-4 towards the driver's side 18*a* and/or away from the passenger's side 18*b* of the vehicle 12. The radiation pattern of the antenna 41 of the fifth communication node 34-5 may extend from the fifth communication node 34-5 towards the front end 16*a* of the vehicle 12 and/or away from the rear end 16*b* of the vehicle 12. The radiation pattern of the antenna 41 of the sixth communication node 34-6 may extend from the sixth communication node 34-6 towards the passenger's side 18*b* and/or away from the driver's side 18*a* of the vehicle 12. The radiation pattern of the antenna 41 of the seventh communication node 34-7 may extend from the seventh communication node 34-7 towards the rear end 16*b* of the vehicle 12 and/or away from the front end 16*a* of the vehicle 12.

As will be described in more detail below, in some implementations, the system 10 may implement a localization strategy using one or more of the communication nodes 34-1, 34-2, 34-3, 34-4, 34-5, 34-6, 34-7, 34-8. For example, the communication nodes 34-1, 34-2, 34-3, 34-4, 34-5, 34-6, 34-7, 34-8 may determine a location of the vehicle access device 14 based on a received single strength indication (RSSI) value (e.g., a calibration value) corresponding to a signal received from the vehicle access device 14. In other implementations, the communication nodes 34-1, 34-2, 34-3, 34-4, 34-5, 34-6, 34-7, 34-8 may determine a location of the vehicle access device 14 based on at least one of (i) the RSSI value, (ii) the angle at which a signal is received by, or transmitted from, the communication nodes 34-1, 34-2, 34-3, 34-4, 34-5, 34-6, 34-7, 34-8, and (iii) the time at which a signal is received by, or transmitted from, the communication nodes 34-1, 34-2, 34-3, 34-4, 34-5, 34-6, 34-7, 34-8.

The control module 23 may control various aspects of accessing and/or operating the vehicle 12. For example, in some implementations, the control module 23 may be, or otherwise include, a body control module configured to communicate with the access system 20 and/or the communication system 22 in order to permit or prevent access to the vehicle 12 through the doors 28. In some implementations, the control module 23 may be, or otherwise include, an engine control module configured to permit or prevent access to the vehicle 12 via the engine (not shown). For example, the control module 23 may permit or prevent the vehicle access device 14 from starting and/or otherwise operating the engine of the vehicle 12. The communication nodes 34-1, 34-2, 34-3, 34-4, 34-5, 34-6, 34-7, 34-8 may communicate with the control module 23 through one or more wired and/or wireless communication protocols, such as LIN Communication, CAN-FD communication, and/or K-Line communication.

The vehicle access device 14 may include a wireless communication device such as a key fob, a smartphone, a smart watch, or a computer (e.g., a tablet, laptop, personal digital assistant, etc.), for example. The vehicle access device 14 may include a communication application 44 and a wireless communication node 46. The communication application 44 may communicate with the communication application 32 of the vehicle 12 through the wireless communication node 46 and one or more of the communication nodes 34-1, 34-2, 34-3, 34-4, 34-5, 34-6, 34-7, 34-8 of the vehicle 12. For example, the vehicle access device 14 may use the communication application 44 to communicate through the wireless communication node 46 with the eighth communication node 34-8. In some implementations, the wireless communication node 46 communicates with the eighth communication node 34-8 through one or more wireless communication protocols, such as short-range radio wave communication, Wi-Fi, BLUETOOTH®, and/or BLE. In this regard, the first wireless communication node 46 may be referred to herein as the BLE communication node 46.

With reference to FIGS. 2A-2D, a method for operating the system 10 is illustrated at 100. In this regard, as will be explained in more detail below, the method 100 may correspond to, or otherwise include, a localization method. For example, the method 100 may include determining the location of the vehicle access device 14 relative to the location of the vehicle 12. In particular, the method 100 may include determining the location of the vehicle access device 14 relative to the front end 16*a*, the rear end 16*b*, the driver's side 18*a*, and/or the passenger's side 18*b* of the vehicle 12. In some implementations, the method 100 may include determining (a) whether the vehicle access device 14 is located within the cabin portion 29 of the vehicle 12, or (b) whether the vehicle access device 14 is located proximate the front end 16*a*, rear end 16*b*, driver's side 18*a*, and/or passenger's side 18*b* of the vehicle 12.

Figure 2A:
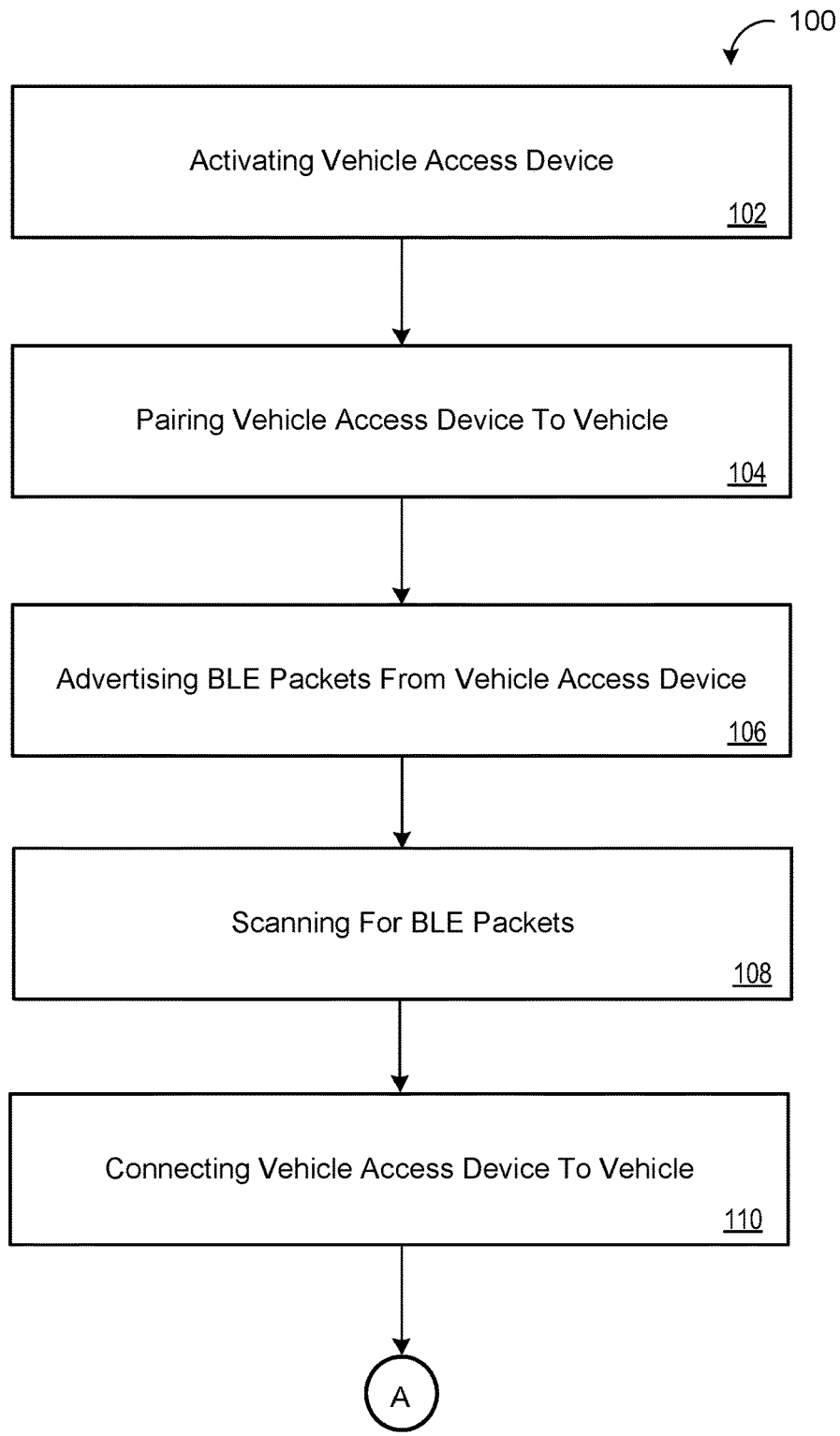

With particular reference to FIG. 2A, at step 102, the method 100 may include activating the vehicle access device 14. For example, at step 102, an end user (e.g., an authorized user of the vehicle 12) may activate the communication application 44 on the vehicle access device 14.

At step 104, the method 100 may include pairing, or otherwise establishing a secure connection between, the vehicle access device 14 and the vehicle 12. For example, the vehicle access device 14 and the vehicle 12 may exchange security credentials, such as identification codes, for example. In some implementations, at step 104, the vehicle access device 14 may transmit security credentials (e.g., an identification code corresponding to the vehicle access device 14) to the vehicle 12, and the vehicle 12 may transmit security credentials (e.g., an identification code corresponding to the vehicle 12) to the vehicle access device 14. In this regard, the wireless communication node 46 of the vehicle access device 14 and the communication node 34*a* of the vehicle 12 may share and store a link key (e.g., a pass code) in order to establish a secure connection between the one of the communication nodes 34-1, 34-2, 34-3, 34-4, 34-5, 34-6, 34-7, 34-8 of the vehicle and the communication node 46 of the vehicle access device 14. In some implementations, the eighth communication node 34-8 may also share the link key with the auxiliary communication nodes 34-1, 34-2, 34-3, 34-4, 34-5, 34-6, 34-7 such that the auxiliary communication nodes 34-1, 34-2, 34-3, 34-4, 34-5, 34-6, 34-7 of the vehicle 12 are securely connected to the communication node 46 of the vehicle access device 14.

At step 106, the method may include advertising (e.g., transmitting) information from the vehicle access device 14. For example, at step 106, the communication node 46 of the vehicle access device 14 may advertise BLE packets 60 (FIG. 1).

At step 108, the method may include searching for and/or receiving information transmitted from the vehicle access device 14. For example, at step 108, one or more of the communication nodes 34-1, 34-2, 34-3, 34-4, 34-5, 34-6, 34-7, 34-8 on the vehicle 12 may start scanning for BLE packets transmitted from the vehicle access device 14, and/or receiving the BLE packet(s) 60 transmitted from the vehicle access device 14. In some implementations, the eighth communication node 34-8 may scan for BLE packets 60 transmitted from the communication node 46 of the vehicle access device 14.

At step 110, the method 100 may include connecting the vehicle access device 14 to the vehicle 12. For example, at step 110, the communication system 22 may wirelessly connect the vehicle access device 14 to the vehicle 12. In particular, the communication system 22 may establish a wireless connection between the eighth communication node 34-8 of the vehicle 12 and the communication node 46 of the vehicle access device 14.

Figure 2B:
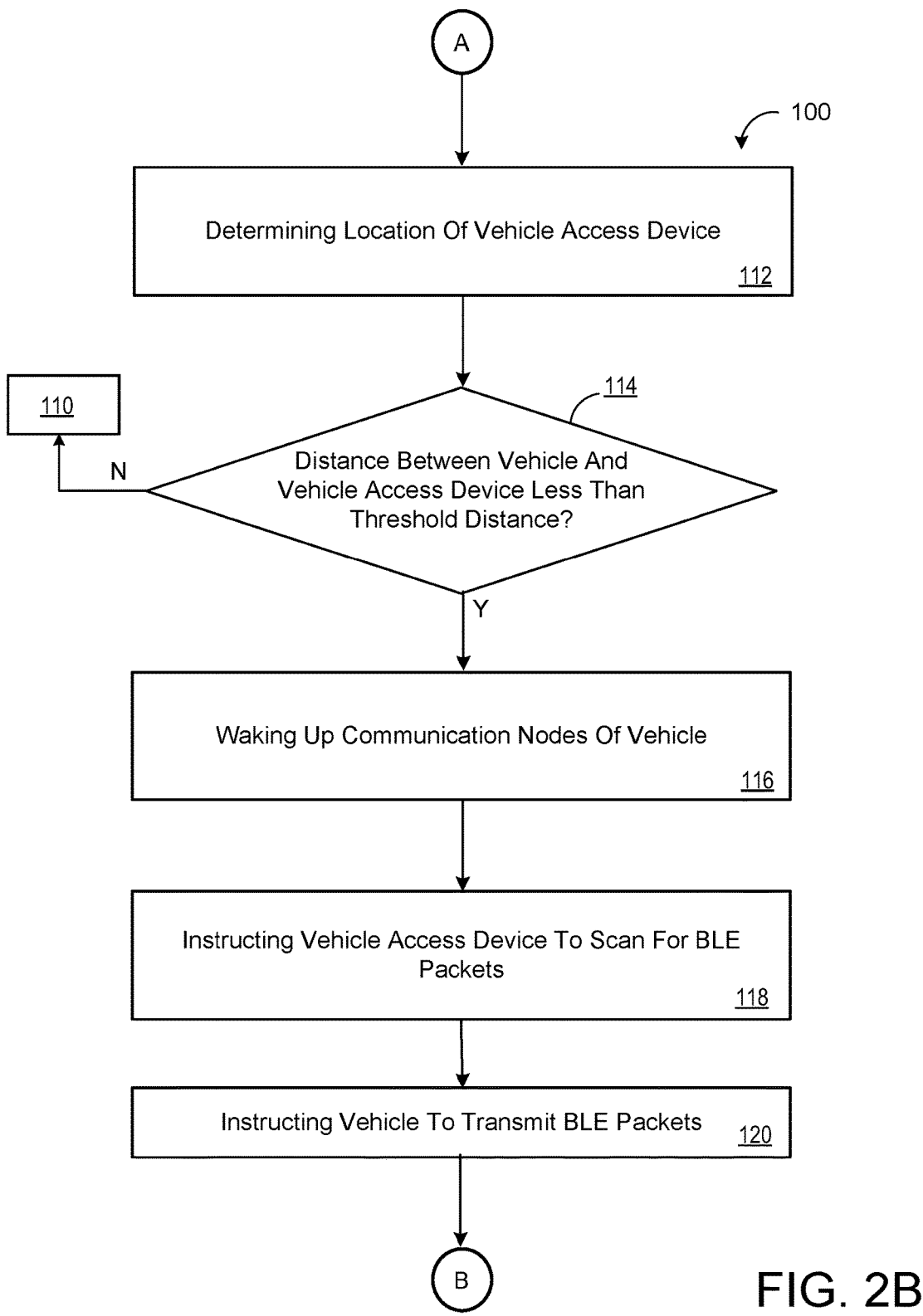

With particular reference to FIG. 2B, at step 112, the method may include determining the location of the vehicle access device 14 relative to the vehicle 12. For example, at step 112, the method may include determining the distance between the vehicle access device 14 and the vehicle 12. In this regard, at step 112, the method may include gathering received single strength indication (RSSI) values (e.g., a calibration values) with the eighth communication node 34-8 and performing one or more smoothing algorithms. For example, at step 112, the eighth communication node 34-8 may gather RSSI values corresponding to the BLE packets 60 advertised from the communication node 46 of the vehicle access device 14 and perform one or more smoothing algorithm, while the communication nodes 34-1, 34-2, 34-3, 34-4, 34-5, 34-6, 34-7 may be in sleep or low power state. In some implementations, performing the one or more smoothing algorithm may include (i) determining which value of the gathered RSSI values occurs most frequently amongst the gathered RSSI values and (ii) determining which values of the gathered RSSI values occur less frequently than the most frequently occurring RSSI value. In this regard, performing the one or more smoothing algorithm may include removing from the gathered RSSI values the RSSI value that occur less frequently than the most frequently occurring RSSI value. In particular, performing the one or more smoothing algorithm may include removing high and/or low outlier RSSI values from the gathered RSSI values to produce smoothed RSSI values.

At step 114, the method may include determining whether the vehicle access device 14 is within a threshold distance of the vehicle 12. For example, at step 114, the method may include determining whether the vehicle access device 14 is less than or equal to ten meters from the vehicle 12. In this regard, the method may include determining whether the communication node 46 is within the threshold distance of the eighth communication node 34-8 of the vehicle 12. If step 114 is false, the method may return to 110. If step 114 is true, the method may proceed to step 116.

At step 116, the method may include activating one or more of the communication nodes 34-1, 34-2, 34-3, 34-4, 34-5, 34-6, 34-7, 34-8 on the vehicle 12. For example, at step 116, the method may include activating the first, second, third, fourth, fifth, sixth, and seventh communication nodes 34-1, 34-2, 34-3, 34-4, 34-5, 34-6, 34-7. In this regard, at step 116, the method may include transmitting an activation signal from the eighth communication node 34-8 to each of the first, second, third, fourth, fifth, sixth, and seventh communication nodes 34-1, 34-2, 34-3, 34-4, 34-5, 34-6, 34-7. At step 116, the method may also include transmitting a confirmation signal from each of the first, second, third, fourth, fifth, sixth, and seventh communication nodes 34-1, 34-2, 34-3, 34-4, 34-5, 34-6, 34-7 to the eighth communication node 34-8. The confirmation signal may confirm to the eighth communication node 34-8 that the first, second, third, fourth, fifth, sixth, and seventh communication nodes 34-1, 34-2, 34-3, 34-4, 34-5, 34-6, 34-7 have been activated.

At step 118, the method may include instructing the vehicle access device 14 to search for and/or receive information transmitted from one or more of the first, second, third, fourth, fifth, sixth, and seventh communication nodes 34-1, 34-2, 34-3, 34-4, 34-5, 34-6, 34-7. For example, at step 118, the eighth communication node 34-8 may instruct the communication node 46 of the vehicle access device 14 to search for BLE packets 60 (FIG. 1) transmitted from the first, second, third, fourth, fifth, sixth, or seventh communication nodes 34-1, 34-2, 34-3, 34-4, 34-5, 34-6, 34-7. Accordingly, at step 118, the communication node 46 of the vehicle access device 14 may perform dual roles of both transmitting and receiving BLE packets 60.

At step 120, the method may include instructing one or more of the first, second, third, fourth, fifth, sixth, and seventh communication nodes 34-1, 34-2, 34-3, 34-4, 34-5, 34-6, 34-7 to transmit BLE packets 60 (FIG. 1). For example, the eighth communication node 34-8 may instruct the first, second, third, fourth, fifth, sixth, and seventh communication nodes 34-1, 34-2, 34-3, 34-4, 34-5, 34-6, 34-7 to advertise BLE packets 60. Accordingly, at step 120, the method may include advertising BLE packets 60 from the first, second, third, fourth, fifth, sixth, and seventh communication nodes 34-1, 34-2, 34-3, 34-4, 34-5, 34-6, 34-7. In some implementations, the first, second, third, fourth, fifth, sixth, and seventh communication nodes 34-1, 34-2, 34-3, 34-4, 34-5, 34-6, 34-7 may advertise BLE packets 60 using a high duty cycle advertising interval. For example, the first, second, third, fourth, fifth, sixth, and seventh communication nodes 34-1, 34-2, 34-3, 34-4, 34-5, 34-6, 34-7 may cycle between (i) advertising for 1.28 seconds and (ii) pausing (e.g., ceasing advertising) for 3.75 milliseconds.

Figure 2C:
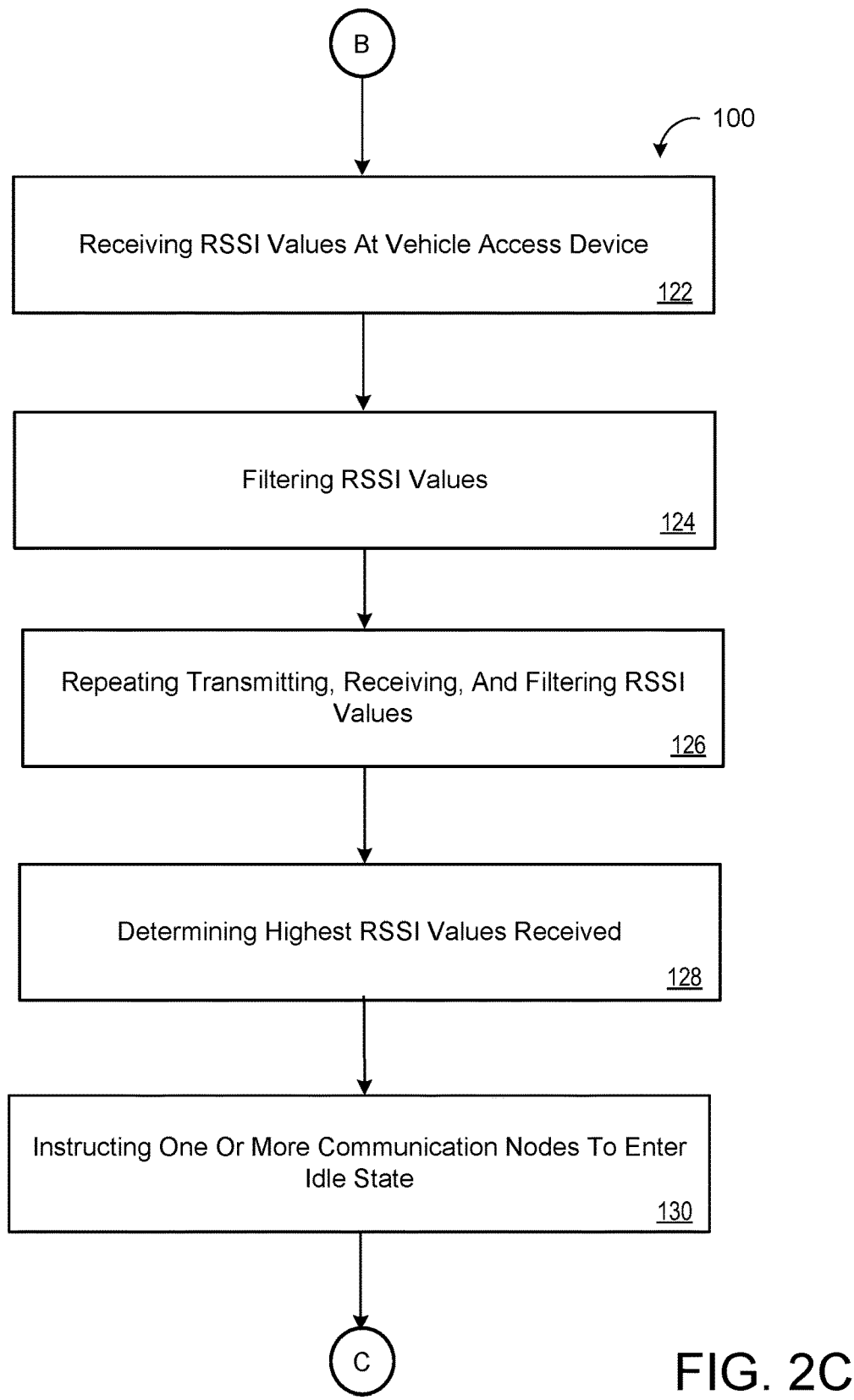

With particular reference to FIG. 2C, at step 122, the method may include receiving RSSI values from one or more of the first, second, third, fourth, fifth, sixth, and seventh communication nodes 34-1, 34-2, 34-3, 34-4, 34-5, 34-6, 34-7. For example, the vehicle access device 14 (e.g., communication node 46) may receive RSSI values corresponding to the BLE packets 60 advertised from each of the first, second, third, fourth, fifth, and seventh communication nodes 34-1, 34-2, 34-3, 34-4, 34-5, 34-6, 34-7 at step 120.

At step 124, the method may include filtering the RSSI values received at step 122. In some implementations, the vehicle access device 14 may filter the RSSI values received at step 124. In other implementations, the eighth communication node 34-8 may filter the RSSI values received at step 124. In this regard, in some implementations, at step 124, the method may include transmitting the RSSI values from the vehicle access device 14 to the eighth communication node 34-8. Filtering the RSSI values at step 124 may include (i) determining which value of the gathered RSSI values occurs most frequently amongst the gathered RSSI values and (ii) determining which values of the gathered RSSI values occur less frequently than the most frequently occurring RSSI value. In this regard, filtering the RSSI values may include removing from the gathered RSSI values the RSSI value that occur less frequently than the most frequently occurring RSSI value. In particular, performing the one or more smoothing algorithm may include removing high and/or low outlier RSSI values from the gathered RSSI values to produce smoothed RSSI values.

At step 126, the method may include repeating one or more of steps 120, 122, and 124 a predetermined number of times. For example, at step 126, the method may repeat the steps of advertising, receiving, and filtering the BLE packets 60 as long as there is a vehicle access device 14 is connected to the eighth communication node 34-8, where the eighth communication node 34-8 will instruct one or more of the first, second, third, fourth, fifth, sixth, and seventh communication nodes 34-1, 34-2, 34-3, 34-4, 34-5, 34-6, 34-7 to perform an operation. In some implementations, repeating the step 120 may include advertising BLE packets 60 from only certain ones of the first, second, third, fourth, fifth, sixth, and seventh communication nodes 34-1, 34-2, 34-3, 34-4, 34-5, 34-6, 34-7. For example, at step 126, the method may repeat the step 120 and only advertise BLE packets from the communication nodes located on the exterior of the vehicle 12. In particular, at step 126, the method may repeat the step 120 and only advertise BLE packets from the first, third, fourth, sixth, and seventh communication nodes 34-1, 34-3, 34-4, 34-6, 34-7.

At step 128, the method may include determining the highest RSSI values relative to the RSSI values transmitted at step 120 and/or 126 and determining the communication nodes (e.g., one or more of the first, third, fourth, sixth, and seventh communication nodes 34-1, 34-3, 34-4, 34-6, 34-7) corresponding to the highest RSSI values and determining the communication nodes (e.g., one or more of the first, third, fourth, sixth, and seventh communication nodes 34-1, 34-3, 34-4, 34-6, 34-7) corresponding to the lowest RSSI values. For example, at step 128, the method may include identifying or determining, with the primary communication node 34-8, the two communication nodes (e.g., two of the communication nodes 34-1, 34-3, 34-4, 34-6, 34-7) corresponding to the two highest RSSI values and determining the three communication nodes (e.g., three of the communication nodes 34-1, 34-3, 34-4, 34-6, 34-7) corresponding to the three lowest RSSI values.

At step 130, the method may include instructing one or more of the communication nodes 34-1, 34-2, 34-3, 34-4, 34-5, 34-6, 34-7 to enter a standby or idle state. For example, the method may include instructing one or more of the communication nodes 34-1, 34-2, 34-3, 34-4, 34-5, 34-6, 34-7 to cease advertising BLE packets 60. In some implementations, at step 130, the method includes instructing one or more of the communication nodes 34-1, 34-2, 34-3, 34-4, 34-5, 34-6, 34-7 corresponding to the lowest RSSI values determined at step 128 to enter a standby state.

Figure 2D:
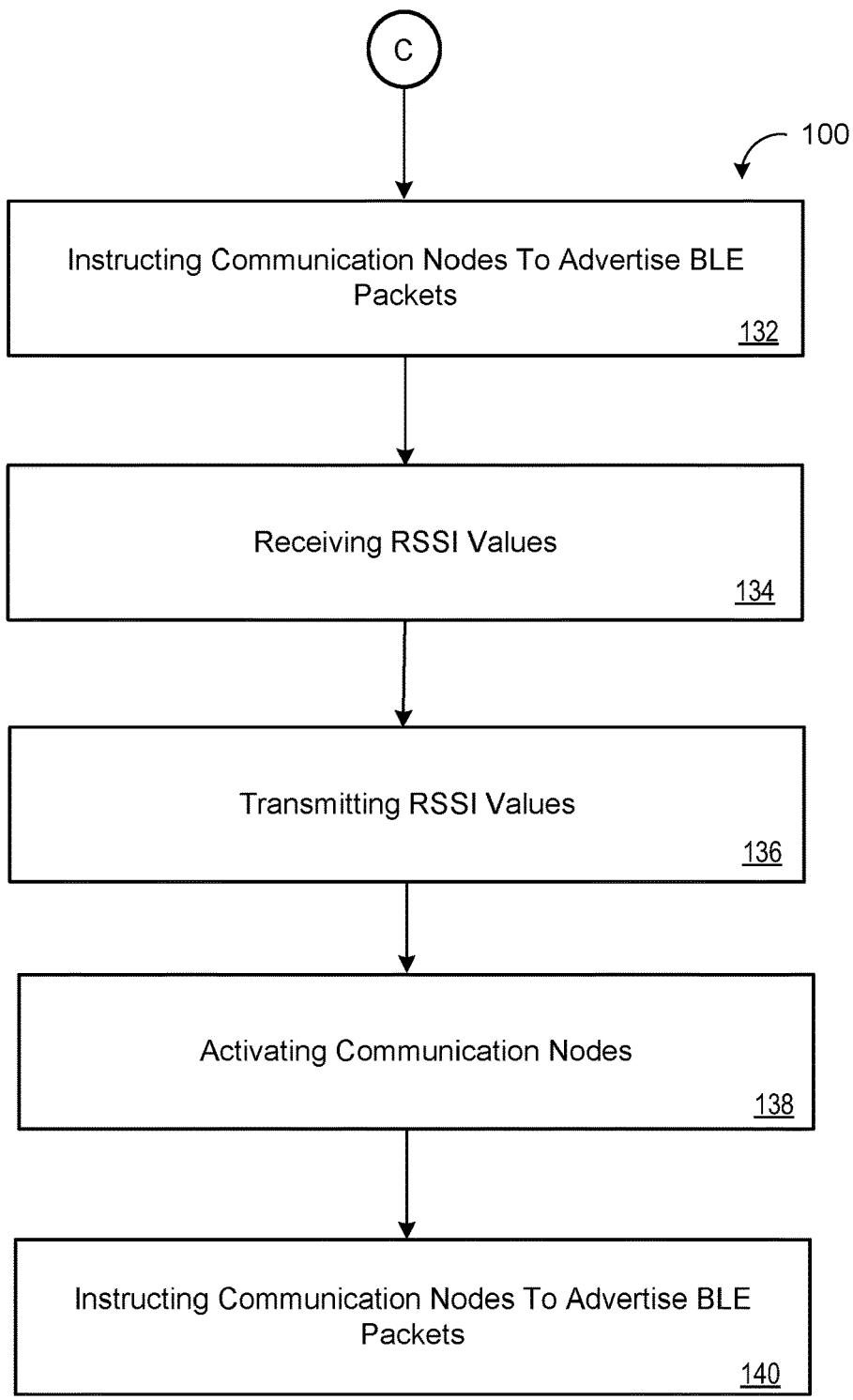

With particular reference to FIG. 2D, at step 132, the method may include instructing one or more of the communication nodes 34-1, 34-2, 34-3, 34-4, 34-5, 34-6, 34-7 to advertise BLE packets 60. For example, at step 132, the eighth communication node 34-8 may instruct one or more of the communication nodes 34-1, 34-2, 34-3, 34-4, 34-5, 34-6, 34-7 to advertise BLE packets 60. In some implementations, the eighth communication node 34-8 may instruct one or more of the communication nodes 34-1, 34-2, 34-3, 34-4, 34-5, 34-6, 34-7 corresponding to the highest RSSI values determined at step 128 to advertise BLE packets 60. In particular, the eighth communication node 34-8 may instruct two of the communication nodes 34-1, 34-2, 34-3, 34-4, 34-5, 34-6, 34-7 corresponding to the two highest RSSI values determined at step 128 to advertise BLE packets 60.

At step 134, the method may include receiving RSSI values from one or more of the first, second, third, fourth, fifth, sixth, and seventh communication nodes 34-1, 34-2, 34-3, 34-4, 34-5, 34-6, 34-7. For example, the vehicle access device 14 (e.g., communication node 46) may receive RSSI values corresponding to the BLE packets 60 advertised at step 132.

At step 136, the method may include transmitting one or more RSSI values from the vehicle access device 14 to one or more of the communication nodes 34-1, 34-2, 34-3, 34-4, 34-5, 34-6, 34-7, 34-8. In some implementations, at step 136, the method includes transmitting from the vehicle access device 14 to the eighth communication node 34-8 the RSSI values received at step 134.

At step 138, the method may include activating one or more of the communication nodes 34-1, 34-2, 34-3, 34-4, 34-5, 34-6, 34-7, 34-8. For example, if the location of the vehicle access device 14 determined at step 112 indicates that the vehicle access device 14 is within a predetermined distance of the vehicle 12, the method may include activating one or more of the communication nodes 34-1, 34-2, 34-3, 34-4, 34-5, 34-6, 34-7, 34-8. In particular, if the location of the vehicle access device 14 is within one meter of one or more of the communication nodes (e.g., one or more of 34-1, 34-2, 34-3, 34-4, 34-5, 34-6, 34-7) corresponding to the BLE packets 60 advertised at step 132, the method may include activating one or more of the communication nodes located in the cabin portion 29 of the vehicle 14. For example, if the method determines at step 112 that the vehicle access device 14 is located in the cabin portion 29 of the vehicle 14, the method may include activating one or more of the second, fifth, and eighth communication nodes 34-2, 34-5, 34-8.

At step 140, the method may include instructing one or more of the communication nodes 34-1, 34-2, 34-3, 34-4, 34-5, 34-6, 34-7 to advertise BLE packets 60. For example, at step 140, the eighth communication node 34-8 may instruct one or more of the communication nodes location in the cabin portion 29 of the vehicle 14 to advertise BLE packets 60. In some implementations, the eighth communication node 34-8 may instruct one or more of the second, fifth, and eighth communication nodes 34-2, 34-5, 34-8 to advertise BLE packets 60. The second, fifth, and/or eighth communication nodes 34-2, 34-5, and/or 34-8 may take turns advertising BLE packets 60 such that one of the second, fifth, and eighth communication nodes 34-2, 34-5, 34-8 is advertising BLE packets 60 prior to another of the second, fifth, and eighth communication nodes 34-2, 34-5, 34-8 advertising BLE packets 60.

Utilizing the method illustrated at FIGS. 2A-2D, the system 10 can effectively and efficiently determine whether the vehicle access device 14 is located inside or outside of the cabin portion 29 of the vehicle 12, while also optimizing the amount of power consumed by the vehicle 12 and the vehicle access device 14.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A method comprising:
   determining a distance between a vehicle access device and a vehicle;
   activating at least one communication node in response to the distance being less than a threshold distance;
   transmitting a signal from the at least one communication node;
   gathering a plurality of received signal strength indication values corresponding to the signal;
   identifying a first value of the gathered plurality of received signal strength indication values that occurs most frequently;
   identifying a second value of the gathered plurality of received signal strength indication values that occurs less frequently;
   removing the second value from the gathered plurality of received signal strength indication value;
   identifying at least one communication node corresponding to a highest value of the plurality of received signal strength indication values; and
   determining whether the vehicle access device is disposed in an interior portion of the vehicle or on an exterior of the vehicle based on the highest value of the plurality of received signal strength indication values.

2. The method of claim 1, wherein the at least one communication node includes a Bluetooth Low Energy communication node.

3. The method of claim 1, further comprising transmitting the plurality of received signal strength indication values from the vehicle access device to the vehicle.

4. The method of claim 1, wherein the at least one communication node includes a plurality of communication nodes disposed on an exterior of the vehicle and a plurality of communication nodes disposed in an interior of the vehicle.

5. The method of claim 1, further comprising idling at least one of the at least one communication node.

6. The method of claim 5, wherein the at least one of the at least one communication node is disposed in an interior of the vehicle.

7. The method of claim 1, wherein transmitting the signal from the at least one communication node includes transmitting the signal using a high duty cycle transmission interval.

8. The method of claim 1, wherein the at least one communication node includes a first communication node disposed in an interior of the vehicle and a second communication node disposed on an exterior of the vehicle, and wherein the method further comprises:
   activating one of the first communication node or the second communication node; and
   idling the other of the first communication node or the second communication node.

9. The method of claim 8, further comprising transmitting the signal from the activated communication node.

10. The method of claim 1, wherein, based on the identity of the at least one communication node corresponding to the highest value of the plurality of received signal strength indication values, a primary wireless communication node is configured to (i) activate a first communication and (ii) idle a second communication node.

11. A system comprising:
    a vehicle access device having a first wireless communication node; and
    a vehicle having a driver's side, a passenger's side opposite the driver's side, a primary wireless communication node and a plurality of secondary wireless communication nodes, the primary wireless communication node configured to communicate with the plurality of secondary wireless communication nodes, the first wireless communication node configured to communicate with the primary and secondary wireless communication nodes,
    wherein the plurality of secondary wireless communication nodes includes a first secondary wireless communication node disposed on an exterior of the vehicle at the driver's side, a second secondary wireless communication node disposed in an interior of the vehicle, a third secondary wireless communication node disposed on the exterior of the vehicle at the passenger's side, a fourth secondary wireless communication node disposed on the exterior of the vehicle, a fifth secondary wireless communication node disposed in the interior of the vehicle, a sixth secondary wireless communication node disposed on the exterior of the vehicle, and a seventh secondary wireless communication node disposed on the exterior of the vehicle.

12. The system of claim 11, wherein the first wireless communication node, the primary wireless communication node, and secondary wireless communication nodes include Bluetooth Low Energy communication nodes.

13. The system of claim 11, wherein the third secondary wireless communication node is disposed proximate a center of the vehicle, the fourth secondary wireless communication node is disposed proximate a first C-pillar of the vehicle, the fifth secondary wireless communication node is disposed in the interior of the vehicle, the sixth secondary wireless communication node is disposed proximate a second C-pillar of the vehicle, and the seventh secondary wireless communication node is disposed proximate a rear portion of the vehicle.

14. The system of claim 11, wherein the first wireless communication node is configured to (i) receive a plurality of received signal strength indication values transmitted from the plurality of secondary wireless communication nodes, (ii) identify at least one communication node corresponding to a highest value of the plurality of received signal strength indication values, and (iii) determine whether the vehicle access device is disposed in an interior portion of the vehicle or on an exterior of the vehicle based on the highest value of the plurality of received signal strength indication values.

15. The system of claim 14, wherein, based on an identity of the at least one communication node corresponding to the highest value of the plurality of received signal strength indication values, the primary wireless communication node is configured to (i) activate one of the first secondary wireless communication node or the second secondary wireless communication node and (ii) idle the other of the first secondary wireless communication node or the second secondary wireless communication node.

16. The system of claim 14, wherein the first wireless communication node is configured to transmit the plurality of received signal strength indication values to the primary wireless communication node.

17. The system of claim 14, wherein the primary wireless communication node is configured to (i) identify a first value of the plurality of received signal strength indication values that occurs most frequently, (ii) identify a second value of the plurality of received signal strength indication values that occurs less frequently, and (iii) remove the second value from the received plurality of received signal strength indication values.

18. The system of claim 14, wherein the vehicle includes a door and a lock control module, the lock control module configured to communicate with the primary wireless communication node to control access to the vehicle through the door based on the identity of the at least one communication node corresponding to the highest value of the plurality of received signal strength indication values.

19. A method comprising:
determining a distance between a vehicle access device and a vehicle;
activating one of a first communication node or a second communication node in response to the distance being less than a threshold distance, the first communication node disposed in an interior of the vehicle, the second communication node disposed on an exterior of the vehicle;
idling the other of the first communication node or the second communication node;
transmitting a signal from the at least one communication node;
gathering a plurality of received signal strength indication values corresponding to the signal;
removing from the gathered received signal strength indication values a first received signal strength indication value that occurs less frequently than a second received signal strength indication value;
identifying at least one communication node corresponding to a highest value of the plurality of received signal strength indication values; and
determining whether the vehicle access device is disposed in an interior portion of the vehicle or on an exterior of the vehicle based on the highest value of the plurality of received signal strength indication values.

20. A system comprising:
a vehicle access device having a first wireless communication node; and
a vehicle having a primary wireless communication node and a plurality of secondary wireless communication nodes, the primary wireless communication node configured to communicate with the plurality of secondary wireless communication nodes, the first wireless communication node configured to communicate with the primary and secondary wireless communication nodes,
wherein the plurality of secondary wireless communication nodes includes a first secondary wireless communication node disposed on an exterior of the vehicle, a second secondary wireless communication node disposed in an interior of the vehicle, and a third secondary wireless communication node disposed on the exterior of the vehicle, and
wherein the first wireless communication node is configured to (i) receive a plurality of received signal strength indication values transmitted from the plurality of secondary wireless communication nodes, (ii) identify at least one communication node corresponding to a highest value of the plurality of received signal strength indication values, and (iii) determine whether the vehicle access device is disposed in an interior portion of the vehicle or on an exterior of the vehicle based on the highest value of the plurality of received signal strength indication values.

* * * * *